United States Patent [19]

Delatorre

[11] Patent Number: 4,875,369

[45] Date of Patent: Oct. 24, 1989

[54] PRESSURE SENSOR SYSTEM

[75] Inventor: Leroy C. Delatorre, Sugar Land, Tex.

[73] Assignee: Panex Corporation, Sugar Land, Tex.

[21] Appl. No.: 102,020

[22] PCT Filed: Sep. 8, 1987

[86] PCT No.: PCT/US87/02285

§ 371 Date: Sep. 8, 1987

§ 102(e) Date: Sep. 8, 1987

[87] PCT Pub. No.: WO89/02512

PCT Pub. Date: Mar. 23, 1989

[51] Int. Cl.⁴ .............................................. E21B 47/00
[52] U.S. Cl. ........................................ 73/151; 73/708;
73/862.63
[58] Field of Search ................. 73/718, 724, 708, 151,
73/862.62, 862.63; 361/283

[56] References Cited

U.S. PATENT DOCUMENTS

| | | | |
|---|---|---|---|
| 3,645,137 | 2/1972 | Hazen | 73/718 |
| 3,697,835 | 10/1972 | Satori | 361/283 |
| 3,858,097 | 12/1974 | Polye | 73/708 X |
| 4,073,191 | 2/1978 | Saigusa | 73/718 X |
| 4,168,518 | 9/1979 | Lee | 73/724 X |
| 4,257,274 | 3/1981 | Shimada et al. | 73/718 |
| 4,322,977 | 4/1982 | Seil et al. | 73/724 X |
| 4,422,125 | 12/1983 | Antonazzi et al. | 73/718 X |
| 4,434,451 | 2/1984 | Delatorre | 73/718 X |
| 4,542,436 | 9/1985 | Carusillo | 73/718 X |
| 4,730,496 | 3/1988 | Knecht et al. | 73/718 X |

FOREIGN PATENT DOCUMENTS

0008572  1/1979  Japan ..................................... 73/718

Primary Examiner—Eugene R. LaRoche
Assistant Examiner—Seung Ham

[57] ABSTRACT

A measurement transducer with a functionally integral quartz material construction to provide spacing measurement gaps transverse to one another with metallized film surfaces defining capacitance plates and electrically conductive paths. The transducer is mounted under compression independent of a protective case and compensates for temperature changes to provide accurate measurements.

19 Claims, 6 Drawing Sheets

PRESSURE SENSOR SYSTEM

FIELD OF THE INVENTION

This invention relates to a measuring system, and more particularly, to a capacitance type quartz transducer for measuring force or measuring force as a function of pressure of fluids at high temperatures, high pressures and under varying temperature, pressure and shock loading conditions.

BACKGROUND OF THE INVENTION

In U.S. Pat. No. 4,091,683 issued May 10, 1978, a system for downhole measurement of pressure is disclosed in which an interrelated capacitance is utilized for measuring pressure. In U.S. Pat. No. 4,322,775 issued Mar. 30, 1982, a sensor construction is disclosed in which the measurements of two capacitors in a sensor construction are obtained and in which there is compensation for the effects of gravity and temperature and in U.S. Pat. No. 4,624,136 issued on Nov. 25, 1986, a typical downhole oil field tool for pressure and temperature is disclosed is illustrated.

While the present invention has a wider application, one of the critical areas of concern to the evaluation of oil field reservoirs involves the determination of downhole pressure and temperature. For this reason, pressure and temperature measurements are taken during the actual drilling operations in procedures called "drill stem tests". Also, after a well is completed, it is a common occurrence to measure the downhole pressure and temperature over a period of time for "production tests". In oil field applications, therefore, measurement of pressure and temperature is an important factor and it is made even more important in that the accuracy of the measurement can be a significant factor in determining the extent of oil reserves available from underground production. The extent of oil reserves is an asset and thus precise measurements are necessary for accurate asset evaluations.

Oil field practices being what they are, cause equipment to be subjected to rough treatment which translates into shock loading for instrumentation in a well tool. It is not uncommon for instrumentation to be dropped at the earth's surface in a shop, or at the well site, or transported at a haphazard speed into or out of the well bore. In some operations, it is sometimes possible to have the pressure and temperature sensing device connected up to the system when a shape charge perforator or other explosive device is detonated in the well bore. Thus, the pressure and temperature measuring equipment is subject to moderate to severe shock loads at any time and preferably a construction which minimizes the effects of shock loading is highly desirable.

Another significant factor in pressure and temperature measurements is the fact that a temperature change can occur in a downhole well situation and because the tool has a temperature response lag factor, the pressure recordings can be inaccurate until the instrument or tool stabilizes at the changed temperature. Thus, there can be a time span of inaccuracy in the pressure measurements while a temperature stabilization process occurs.

In a typical oil field production test of temperature and pressure, the instrumentation is lowered typically on an electrical wireline, slick line or tubing into the well bore and the tool senses the pressure and temperature in the well bore over a period of time. This data collected over a period of time is either read out at the surface or retained in a downhole memory for subsequent analysis.

In a non-oil field application, the transducer can be utilized for measuring force, i.e., weight or load directly with a high degree of accuracy.

THE PRESENT INVENTION

The present invention is embodied in a force responsive sensor where the application of pressure produces a force and a corresponding displacement of a measuring element where the displacement of the measuring element is a function of pressure. The present system contemplates an integrally constructed transducer in which a reference capacitance and a sensor capacitance are arranged for measurement of a displacement parameter of the transducer. The transducer is constructed of an elastic material under a compressive load so as to better resist the effect of shock loading and has a low coefficient of expansion per degree of temperature change and is relatively unaffected by changes in temperature. By the location of the capacitance devices within an integral structure, the effects of temperature and sensor distortion are automatically compensated for by the system. A bellows constructed of a metal configuration to a bellows shape receives liquid or fluid under pressure and contains the pressure while a force proportional to the pressure is applied to produce a small displacement in the measurement element. The entire measurement unit is preferably mounted in a vacuum or inert atmosphere and provides a miniaturized, highly accurate force sensor for pressure which is substantially independent of temperature and stress effects.

DESCRIPTION OF THE DRAWINGS

In the accompanying drawings

DESCRIPTION OF THE PRESENT INVENTION

Quartz material is well known as a measurement medium. The properties of quartz include ideal elastic deformation in compression with relatively no creep and no hysteresis up to compression values of 2500 psi.

Above 2500 psi to a pressure in excess of 100,000 psi, quartz materials are still effective for obtaining reliable measurements despite some creep effect. Quartz, however, is subject to breaking under tensile loads and quartz is affected by temperature, although the temperature coefficient of expansion is only $0.31 \times 10^{-6}$ inches per inch per degree fahrenheit. In the present invention, the term "quartz" is used to designate a preferred material and other similar materials as will suggest themselves to one skilled in the art. For example, cervits material such as "Zerodur" (Shott Company), which is a glass ceramic, can be utilized and some ceramics materials contain or have the necessary properties for transducer use according to the present invention. What is desirable in the material for transducer use is a repeatable elastic characteristic, retraceability characteristics under different temperature conditions, and a low temperature coefficient of expansion. Quartz is a highly suitable material having relatively few impurities to affect its elasticity. Generally, as the impurities increase in an elastic material such as quartz, the elasticity properties diminish.

It should also be appreciated that the drawings herein are greatly enlarged in size as the application herein involves miniaturization to a high degree and precision accuracy to obtain precision results. The specific application disclosed involves instrumentation which is sized in cross-section to pass through a tubing diameter of one to two inches in an oil field environment. The instrumentation must be able to survive or accommodate surface and downhole shock loads without damage and produce high pressure measurements with a high degree of accuracy over a wide range of temperatures and temperature changes occurring over a short period of time.

"Quartz" as used herein as a measurement media is a fused silica or amorphous quartz which is much less expensive than crystalline quartz. Crystalline quartz may, however, be utilized if desired.

Figure 1:
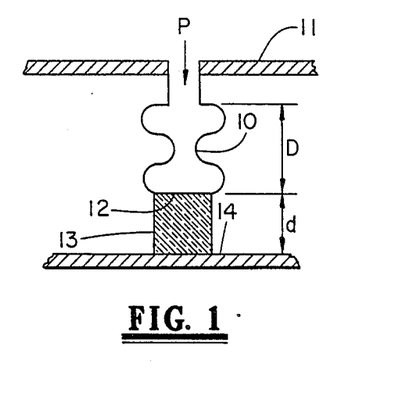
FIG. 1 is a schematic representation for illustration of the concepts of the present invention.

As shown in FIG. 1, a diaphragm or bellows 10 is attached to a support or base member 11 with its free end 12 disposed on a quartz measurement element 13 that, in turn, is mounted on a support or base member 14. The bellows 10 can be used to receive a fluid under high pressure "P" which produces a force causing a displacement "d" of the quartz element 13 which is proportional to the pressure and controls the displacement "D" of the bellows 10. Thus, large forces can be sensed without substantial displacement of the quartz element 13 and thus reduce or minimize the error due to the displacement of the bellows 10.

As an order of magnitude the sensitivity of a bellows 10 in the present invention is contemplated at 0.01 inches for 10,000 pounds of pressure and displacement of $200 \times 10^{-6}$ inches for the sensor element 13. The 10,000 psi pressure is converted to a 1,000 pound total load by the bellows 10 to cause a displacement of $200 \times 10^{-6}$ inches for the sensor element. A typical surface area for the sensor element in contact with the bellows 10 is 0.2 square inches which provides a stress level range of the sensor element 13 from zero to 5,000 psi. By changing the surface area, the pressure range and stress levels can be selected as desired.

Figure 2:
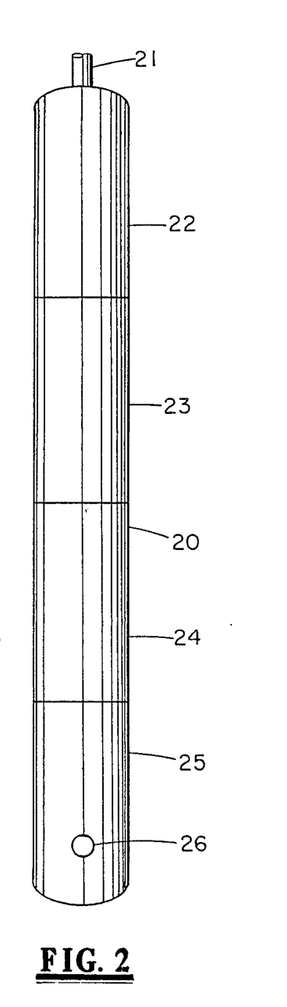
FIG. 2 is a view of an oil tool in which the present invention can be embodied.

As shown in FIG. 2, a downhole tool 20 is sized for insertion through a small diameter well tubing on the end of a wire line cable 21. The tool 20 generally would include a battery pack 22 as a source of power, an electronics section 23 for electrically processing and powering the instrumentation, a temperature sensor section 24 for sensing temperature and a pressure sensor section 25 for sensing pressure. An opening 26 admits fluid under pressure to the pressure sensor in the sensor section 25.

In permanent gauge installations, the temperature and sensor sections are incorporated into the downhole equipment for permanent positioning on the well bore.

Figure 3:
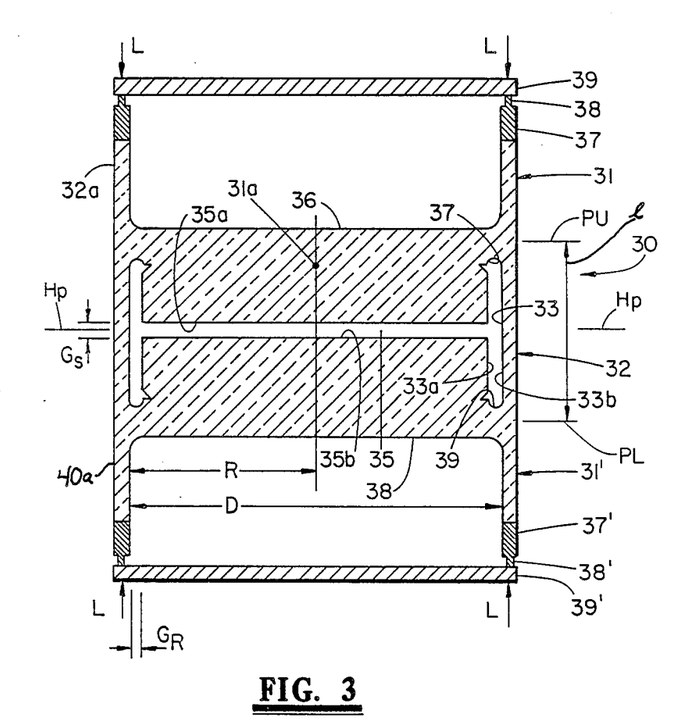
FIG. 3 is a schematic illustration in vertical cross-section of a transducer embodying the present invention.
Figure 4:
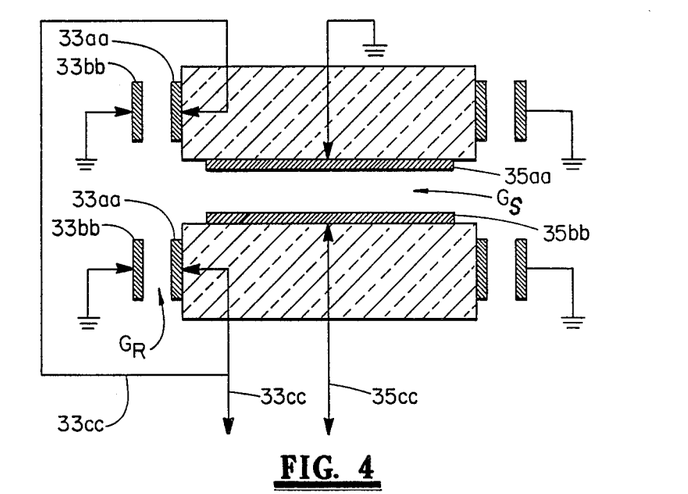
FIG. 4 is a schematic illustration of the capacitance plate arrangement of the present invention.

Referring now to FIG. 3, a transducer assembly of the present invention is shown as an integral unit 30. The unit 30 is symetrically constructed above and below a horizontal plane $H_p$ and is cylindrically configured about a central axis 31a. The unit 30 has upper and lower annular end portions 31, 31', and a central section 32 containing a toroidal space 33 defined by inner and outer cylindrical walls 33a, 33b where the inner and outer walls are normally spaced from one another by a spacing dimension $G_R$ (reference gap). The central cylindrically shaped section 32 also contains a horizontal, circularly defined space 35 defined by upper and lower concentric walls 35a, 35b where the upper and lower walls are spaced horizontally from one another by a spacing dimension $G_s$ (sensor gap). As is explained in detail later herein, the reference gap $G_R$ is the spacing between vertically spaced electrical capacitance plates 33aa, 33bb, (See FIG. 4). The sensor gap $G_s$ is the spacing between horizontally spaced concentrically arranged electrical capacitance plates 35aa, 35bb (See FIG. 4). The capacitance plates (35aa, 33bb) of the gap $G_R$ and the gap $G_s$ each are connected to a common electrical ground. The capacitance plates 33aa of the gap $G_R$ are connected via conductors 33cc to electrical circuitry (not shown) which is responsive to change in capacitance due to a change in the spacing of the gap $G_R$. The capacitance plate 35bb of the gap $G_s$ is connected via a conductor 35cc to electrical circuitry (not shown) which is responsive to change in capacitance due to a change in the spacing of the gap $G_s$.

In the form shown in FIG. 3, the unit 30 has an active length "l" which is the length of the column that affects the gap spacing $G_s$ upon compression. The same length affects the gap spacing $G_s$ in response to changes due to temperature. The length "l" is located between parallel planes $P_u$ and $P_L$. The plane $P_u$ is located midway between an upper boundry surface 36 and the upper end 37 of the toroidal space 33. The plane $P_L$ is located midway between a lower boundry surface 38 and the lower end 39 of the toroid space 33. The upper and lower annular rings 37, 37' are attached to the ends of the unit 30. The rings 37, 37' have reduced cross-sectional annular ring portions 38, 38' to reduce the effect of loading moments caused by uneven loading. The ring portions 38, 38' engage load plates 39, 39' which receive an equal and oppositely applied load "L". The end portions 31, 31' have an inner diameter "D" which is equal to the diameter of the surface 33b. One half of the diameter D is equal to the radius R.

When the unit 30 is subjected to a compressive load, the length "l" is the active measurement length which changes. The same length "l" is the active measurement length which changes when the temperature of the unit 30 changes.

For steady state temperature (all parts in temperature equilibrium) then the gap $G_s$ will change in proportion to the expansion coefficient of the material having an effective length equal to the dimension of the gap $G_s$. For transient temperature conditions, the change in the dimension of the gap $G_s$ is determined by the temperature coefficient of the material for the entire active length "l".

Figure 5:
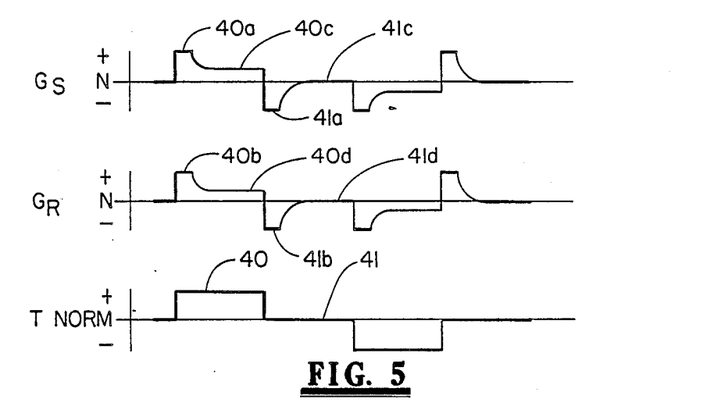
FIG. 5 is a graphic representation of the changes in gap spacing as a function of temperature.

As shown in FIG. 5, a temperature increase from normal or a static temperature to a higher temperature level 40 applied to the outside of the unit 30 will produce a corresponding spacing change 40a, 40b in both the gap $G_S$ and $G_R$ so that the relationship between the gap $G_S$ and $G_R$ remains the same. As the temperature change permeates through the unit 30 to reach temperature equilibrium, the spacing change of the gaps will again track to a level 40c, 40d at an equilibrium temperature. The levels 40c, 40d are spacings equal to the expansion of the vertical length of material in the central section 32 equal to the spacing of the gap $G_S$. Return of the temperature from the level 40 to a normal temperature level 41 will produce a corresponding spacing change 41a, 41b (which is equal and opposite to the respective changes 40a, 40b). As the temperature change permeates through the unit 30 to reach a temperature equilibrium the spacing change of the gaps will again track to the normal level 41c, 41d. The opposite effect is produced when the temperature level decreases relative to the temperature norm.

Figure 6:
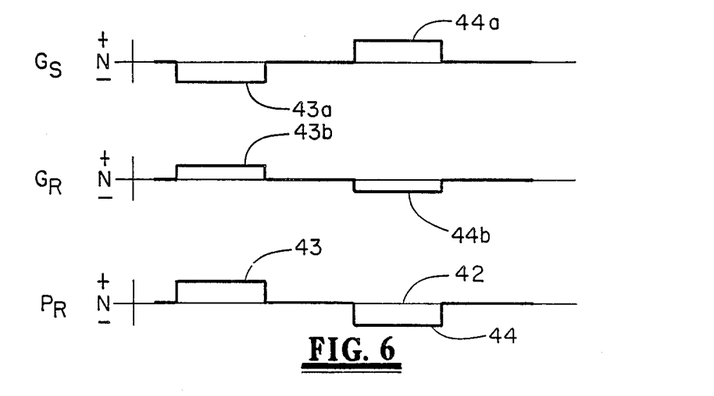
FIG. 6 is a graphic representation of the change in gap spacing as a function of pressure.

Referring now to FIG. 6, the effect of a pressure or force increase or decrease from a normal 42 is illustrated. When the pressure is increased as at 43, the spacing of the gap $G_S$ decreases while the spacing of the gap $G_R$ increases. The gap $G_R$ does not change in dimension as much as the gap $G_S$ because of the poisson ratio effect on cylinder expansion. Where pressure is decreased as at 44, the spacing of the gap $G_S$ increases while the spacing of the gap $G_R$ decreases.

In the processing of data by the electronics section, the pressure reading is determined by the relationship $$P = K\left(1 - \frac{C_R}{C_S}\right) \quad (1)$$

Where P is pressure; K is a constant, $C_r$ is the reference capacitance and $C_s$ is the sensor capacitance.

For the condition where $C_r$ is equal to $C_s$ and a temperature change causes an equal change in $C_r$ and $C_s$ then the temperature effect cancels out in the unit 30.

As pressure is applied there is a residual effect but this effect is reduced by the effect of the opposite responses. Thus, the pressure effect is reduced with respect to the error due to change in dimensions between the gaps $G_S$ and $G_R$.

Considering the effect of temperature external to the unit 30, a change in temperature applied to the outside wall 32a of the unit 30 is not immediately reflected uniformly throughout the element. That is, the temperature on the wall 32a will be different than at the point 31a within the unit 30. Thus, a change in temperature produces a gradient change from an outer temperature on the outer surface to the temperature of the inner mass at point 31a which stabilizes to the outer temperature over a period of time. This time can be considerable since quartz has poor heat conductivity. Thus, for a given change of temperature, a given material requires a given amount of time to stabilize the entire mass of material to the new temperature. During this period of time, the unit has different temperatures at different portions of the unit.

In the unit 30, the capacitance of the gap $G_S$ proportional to the load L and is proportional to the change of temperature. The capacitance of the gap $G_R$ is also proportional to the change in temperature differential. These relationships can be conceptually understood by considering a compressive load "L" applied to the unit 30 by the plates 39, 39' will produce compression of the outside wall of the element 30 which reduces the spacing dimension of the sensor gap $G_S$ while the intermediate wall sections will bulge outwardly to increase the spacing dimension of the reference gap $G_R$.

As an example of temperature effects, if there is an increase in temperature applied to the outer wall 40a, the outer wall will tend to expand which causes the spacing dimension of the reference gap $G_R$ to increase. The expansion of the outer wall affects the gap $G_S$ and $G_R$ equally.

As an example of the magnitudes involved where the full scale dimension change of the sensor gap $G_S$ is from 0 to $200 \times 10^{-6}$ inches, the dimension "l" is 0.4 inches. The temperature coefficient of quartz is $0.31 \times 10_{-6}$ per degree fahrenheit, therefor, for a change of 10° F., the sensor capacitance would increase for the transient effect $$0.31 \times 10^{-6} \times 10° \times 0.4 = 0.124 \times 10^{-6} \quad (2)$$

until the temperature stabilizes.

The percent of change for 10° F. is then equal to $$\frac{.124 \times 10^{-6}}{200 \times 10^{-6}} = \frac{X}{100} \text{ or } X = .062\% \quad (3)$$

After stabilization, all material is the same temperature and therefore all dimensional changes cancel except for the length of material equal to the gap $G_S$. For this example, the residual change would be $$0.31 \times 10^{-6} \times 10° \times 0.5 \times 10^{-3} = 1.55 \times 10^{-9} \quad (4)$$

The percent change for steady state condition is $$\frac{1.55 \times 10^{-9}}{200 \times 10^{-6}} = 7.8 \times 10^{-6} \quad (5)$$

or $$7.8 \times 10^{-4}\% \quad (6)$$

The active length responding to transient temperature for gap $G_R$ is the radius or the diameter divided by two because a change in temperature of the outer cylinder causes the inner surface to displace and change the gap proportional to this length.

In the drawing it will be noted that the juncture of a horizontal and vertical wall is curved as is the inner spacing. The purposes of the curvature are to reduce stress concentration in the material upon loading for managing stress fracture.

Figure 7:
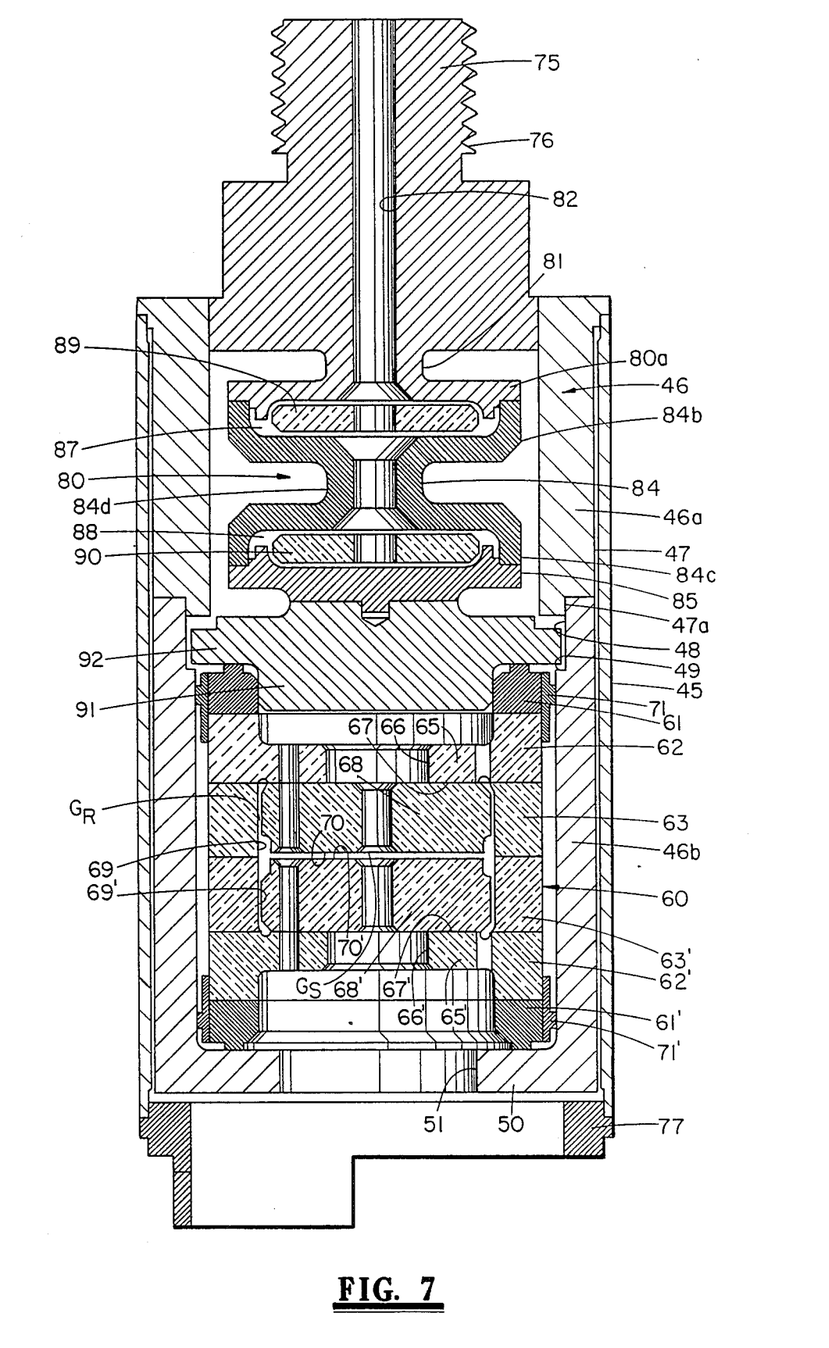
FIG. 7 is an illustration in cross-section of a transducer embodying the present invention.

Referring now to FIG. 7, the pressure transducer embodying the present invention includes an outer, thin walled tubular housing 45 constructed of stainless steel. The upper end of the housing 45 is connected to an inner tubular housing 46. The inner tubular housing 46 includes a tubular upper member 46a constructed of stainless steel and a tubular lower member 46b made from INVAR, where the lower member 46b also is part of a support housing for a transducer unit. The upper member 46a has a wall section 47 of reduced diameter which has an outer surface spaced inwardly from the inner wall of the housing 45. The upper member 46a at its lower end has another wall section 47a of reduced diameter which receives and is connected to the upper tubular end of a lower member 46b. The lower member 46b defines an annular recess 48 with the upper member 46a where the annular recess 48 has an upwardly facing stop shoulder 49. At the bottom end of the lower member 46b is an inwardly directed flange 50 which defines an access opening 51 for electrical connector wires (not shown). The upper member 46a is made of stainless steel and the lower member 46b is made of INVAR. The housing 45, members 46a and 46B are interconnected by welding for structural integrity.

A transducer unit 60 is mounted in the lower member 46b. The unit 60 from top to bottom has interconnected transducer members forming a functionally integral unit. An upper annular load ring member 61 (INVAR) abuts the functionally integral transducer members which include an upper support ring member 62, an upper intermediate ring member 63, a lower intermediate ring member 63', a lower support ring member 62' constructed from quartz, and a lower annular load ring member 61' of INVAR abuts the lower end of the transducer members. The unit 60 on either side of a horizontal midsection plane extending through the adjoining face surface of members 63, 63' is in a mirror image configuration. The upper support ring member 62 has an inwardly extending flange 65 with a center opening 66 and the lower support ring 62' has an inwardly extending flange 65' with a center opening 66'. Attached to the undersurface 67 of the flange 66 is a toroid member 68 which is concentric with the inner wall 69 of the ring member 63 and defines the reference gap $G_R$. Attached to the upper surface 67' of the flange 65' is a toroid member 68' which is concentric with the inner wall 69' of the ring member 63' and defines the reference gap $G_R$. The facing surfaces 70 and 70' of the upper and lower toroid members 68, 68' are spaced from one another by the spacing distance or gap Gs (sensor gap). The upper and lower ring members 61 and 61' are constructed from INVAR or a functionally equivalent material while the members 62, 63,62',63',68 and 68' are constructed from quartz or a functionally equivalent material. The transducer unit 60 is fused or bonded into an integral unit. At the upper and lower ends of the element 60 are annular spacer rings 71, 71' constructed from INVAR and sized to snugly mount the element 60 within the bore of the lower member 46b. In this construction, the material INVAR is used because it most nearly matches the temperature coefficient of expansion of quartz. For materials other than quartz a similar expansion structural material will be chosen.

Between the transducer unit 60 and an attachment end member 75 is a bellows means 80. The end member 75 is a cylindrically shaped element with a terminal threaded end portion 76 for coupling to a pressure source opening or conduit in a pressure instrument or pressure housing. The end member 75 is attached to the upper member 46a. The housing 45 at its lower end is connected to a ring member 77 of the stainless steel which connects to an electronic housing (not shown).

As shown in FIG. 7, the upper end member 75 attaches to a pressure point in a housing (not shown) and at the lower end, the ring member 77 is attachable to an electronics instrument housing (not shown). Between the ring 77 and the end member 75 the housing 45 receives all tension and compressive stress and the transducer unit 60 is independently supported by the member 46b and is not subject to external stress factors.

At the lower end of the end member 75 is an annular flange 80a formed by a necked down portion 81 in the end member 75. A pressure passageway 82 extends centrally through the end member 75. The diaphragm or bellow means 80 includes the flange member 80a, an "H" shaped member 84, and a lower cap member 85. The H shaped member 84 includes an upper tubular section 84b which is joined to a lower tubular section 84c by a tubular section 84d of smaller diameter. The lower end cap member 85 is cylindrically shaped and fits into the lower tubular section 84c. Thus, the hollow interior of the assembly 80 defines a bellows or diaphragm which can respond to pressure. Disposed in the cylindrical cavities 87, 88 are toroidally shaped ceramic discs 89, 90 which serve as space fillers to reduce the volume of pressure fluid required in the bellows. The bellows 80 and end cap 85 can be made of stainless steel.

Between the lower end cap member 85 and the load ring member 61 is an annular force plate member 91. The force plate member 91 has a flange 92 which extends into the recess 48 and overlaps the upwardly facing stop shoulder 49. Thus, the shoulder 49 provides a limit of travel of the force member 90 relative to the transducer unit 60. In assembly, the unit 60 is disposed in the member 46b and the plate member 91 positioned on the unit 60. The members 46a, 46b are joined to one another by bonding, fusion, welding or the like and the housing 45 attached to the upper member 46a. The bellows assembly 80 is inserted and a predetermined compressive load is applied between the end member 75 an the end member 50 to apply a compression preloading on the unit 60. This preloading serves to make the unit 60 less fragile with respect to shock loads and provides a precise setting for the proper mating of load bearing parts for a normal condition. A load of 100 pounds is used although this may be varied.

Figure 8:
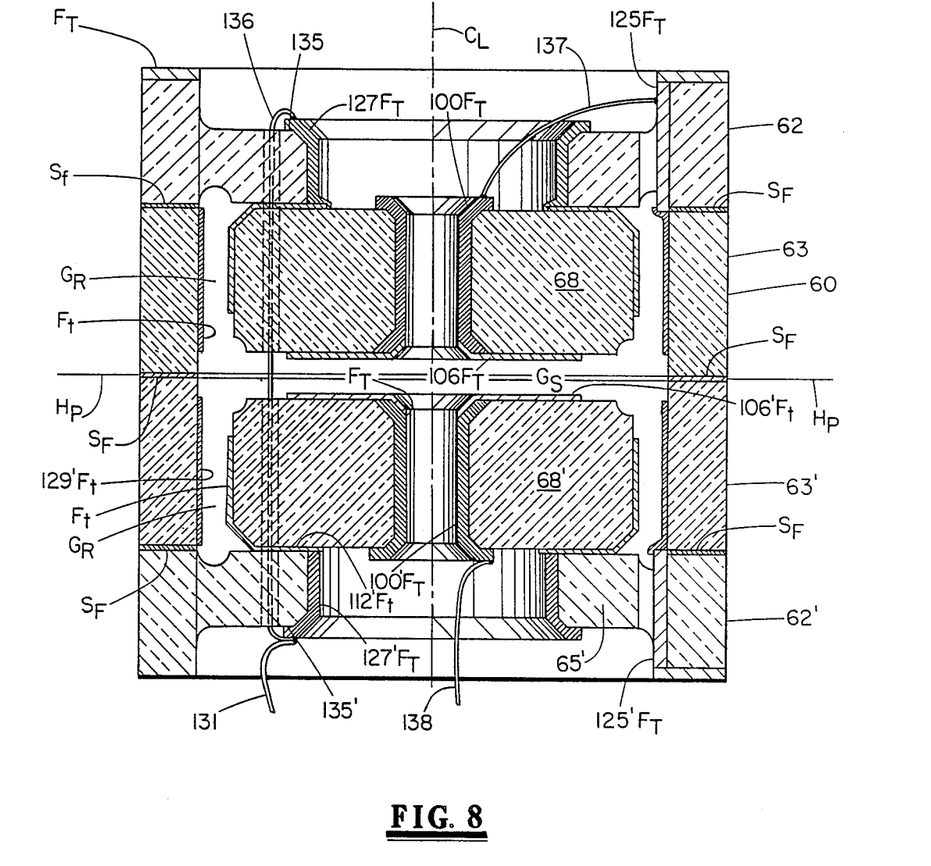
FIG. 8 is an enlarged view in cross-section of construction details of a transducer embodying the present invention.

FIG. 8 is an enlarged illustration of constructional details in which the unit 60 has mirror image components with respect to a horizontal plane Hp and is symetrical with respect to the central axis $C_L$. In the construction of the unit 60, use is made of thin films ($F_t$) and thick film ($F_T$) where a thin film is a metal film applied by sputtering or evaporation on a polished surface and has a thickness on the order of 2 to $50 \times 10^{-6}$ inches and a thick film is a metal film applied by brush or other means and has a thickness on the order of 0.1 to $0.5 \times 10^{-3}$ inches. Also, the quartz parts are joined to one another by use of a fusible glass frit ($S_F$) which upon fusion has a thickness dimension of 0.0005 inches.

Figure 9A:
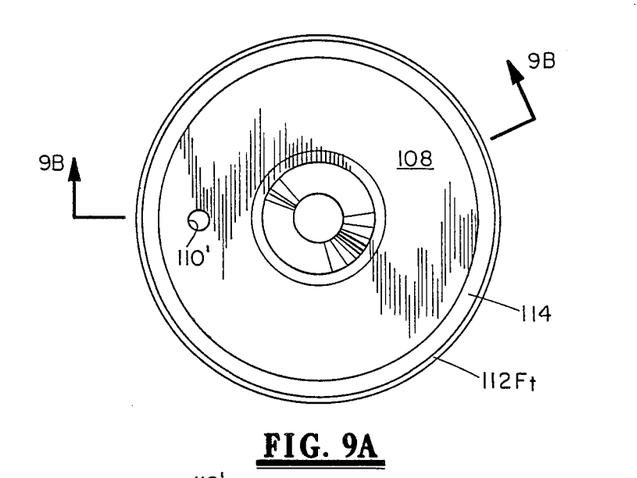
FIG. 9A is a view of a toroid member.
Figure 9B:
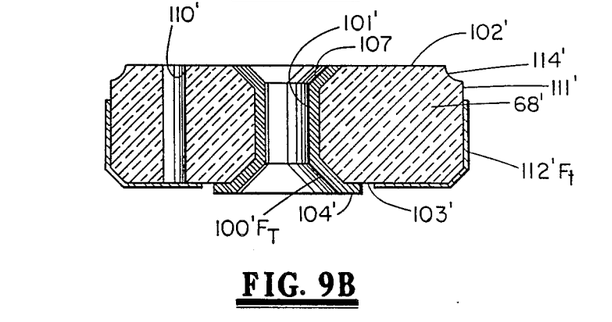
FIG. 9B is a view in cross-section taken along line 9B—9B of FIG. 9A.
Figure 9C:
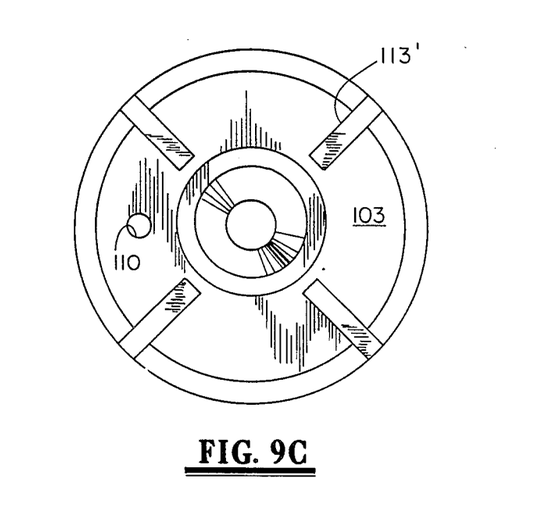
FIG. 9C is a bottom view of the toroid member shown in FIG. 9A.

The toroid members 68, 68' are made separately from the ring members 62, 63 and then combined into the integral unit. As shown in FIG. 9a, a toroid member 68' is toroidally shaped and a thick film 100' $F_T$ is applied to the bore 101' of the toroid from a location adjoining the top surface 102' to a location 104' overlapping a portion of the bottom surface 103'. The upper and lower edges of the bore 101' have 45° bevels to facilitate attachment of the film to the quartz. An output wire is connectable to the coating at location 104'. The toroid element 68' has a cylindrically shaped passageway 110' located eccentrically to the bore 101' where the passageway 110' serves to pass connector wires through the element 68'. As shown in FIGS. 9b and 9c, the annular exterior surface 111' is coated by sputtering or evaporation with a thin film 112'$F_t$ where the thin film 112' $F_t$ extends along the bottom surface 103' in radial strips 113' where the radial strips 113' are for electrical connecting purpose. The film 112'F$_t$ on the side wall 111' has a controlled thickness of $16 \times 10^{-6}$ inches. At the upper end of the member 68' is an annular groove 114' which is used to hold a temporary O-ring during a polishing operation.

Figure 10A:
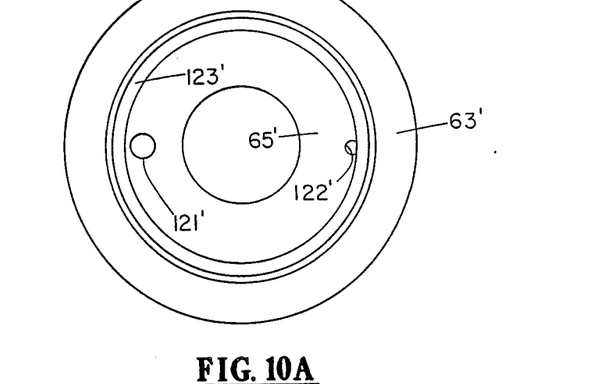
FIG. 10A is a plan view of the ring member 63'.
Figure 10B:
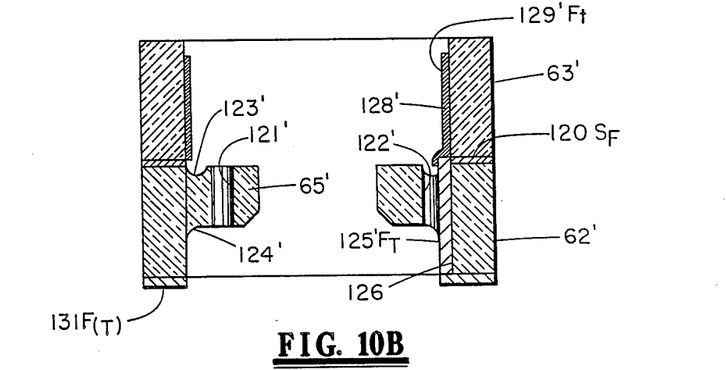
FIG. 10B is a view in cross-section through FIG. 10A.
Figure 10C:
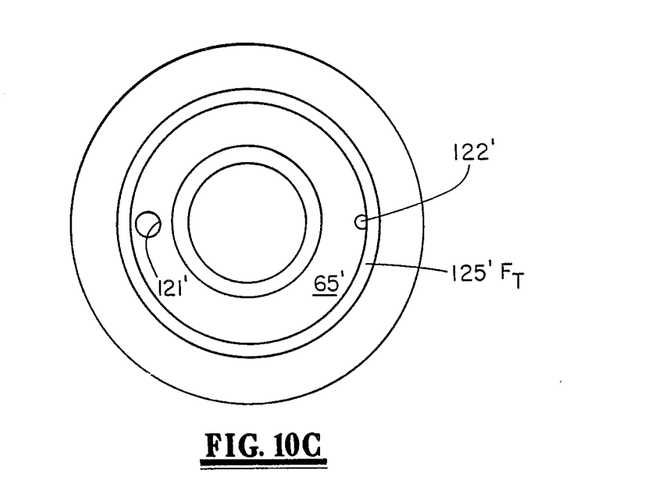
FIG. 10C is a bottom view of the ring member 62'.

Referring to FIGS. 10A–10C, the ring members 63', 62' are illustrated in a connected condition. Between the members 63', 62' is a connecting glass frit 120 S$_F$. It is feasible in some instances to directly fuse one part to the other and not use a glass frit. The flange 65' in the ring member 62' has diametrically located bores 121', 122'. The upper surface 67' of the flange has an annular groove 123' located opposite to a radii curve 124' on the lower surface of the flange. The groove 123' and curve 124' are located at the juncture of the cylindrical wall of the member 62' and the flange so as to remove stress concentrations at the juncture. The bore 121' is located just within the inner circumference of the groove 123' and is arranged for alignment with the bore 110' in a toroid ring member 68'. The other bore 122' is located in the flange so that a thick film 125'F$_T$ can be applied to the inner surface 126' of the ring member and passed through the bore 122'. Thus, with the film 125'F$_T$ in place on the ring element 62' the top surface of the ring member 62', the inner bore 128' of the ring member 63' can receive a thin film 129'F$_t$ by sputtering or evaporation and the film 129'F$_t$ overlaps the thick film 125F$_T$ for electrical connection. The thin film 129'F$_t$ forms the outer plate member of a reference capacitor and is a controlled dimension of $16 \times 10^{-6}$ inches. The end of the ring member 62' has a thick film 131F$_T$ which provides an electrical contact surface as well as a cushion medium between the quartz and metal surfaces.

When the ring members 62', 63' are coated with films, the next step is to integrate a toroid member 68' With the ring members 62', 63'. A glass frit S$_F$ is disposed between the radial strips 113' so that the toroid member 68' can be attached to the flange 65' of a ring member 62' with the thin film 112'F$_t$ forming the other plate of the capacitance. A thick film 127'F$_T$ (see FIG. 8) is applied to electrically connect the thin film 112'F$_t$ to a convenient location 135' on the end surface of a flange 65'. In assembly, the bores 110' and 121' are aligned. After assembly, the top surface is ground flat and the thin film 106'F$_t$ applied (see FIG. 8) by sputtering or evaporation to provide an annular plate member which overlaps and makes electrical contact with the thick film 100'F$_T$ in the bore 101'.

Two subassemblies are then aligned and interconnected by fusing so that the sensor gap G$_s$ is defined by the capacitor plates formed by the thin films 106 F$_t$ and 106'F$_t$. A wire connector 136 is attached to the upper thick film 127F$_T$ and passed through the bores 121, 110, 110' and 121' to couple with a wire connector 131 and the thick film 127'F$_T$ at the bottom of the unit. Thus, the reference capacitor films on the toroid members are connected to a common output wire. The circumferential films 129F$_t$ and 129'F$_t$ of the reference capacitor are connected via the thick films 125F$_T$ and 125'F$_T$ to the ends of the ring members 62, 62' where there is a connection by surface contact to an electrical ground. A wire 137 is connected between the thick film 125F$_T$ and the thick film 100F$_T$ to convert the one capacitor plate 106F$_t$ to electrical ground. A wire connected to the other thick film 100'F$_T$ and capacitor plate 106'F$_t$ provides an output wire or conduit for the sensor G$_s$.

The construction and use of the foregoing invention provides a force transducer which is highly miniturized yet capable of measuring large forces. The unit as described in FIG. 7 has the transducers in an inert gas atmosphere or sealed with respect to the outside atmosphere. The unit provides safety against rupture and uses the desirable elastic and temperature characteristics of quartz. The construction provides for uniform loading without significant stress concentrations and particularly without tensile stresses. It will be appreciated that the modulus of elasticity for quartz is about one-third of the modulus for steel and thus, the effects of the housings are greatly reduced.

The foregoing disclosure and description of the invention are illustrative and explanatory thereof, and various changes in the size, shape and materials, as well as in the details of the illustrated construction may be made without departing from the spirit of the invention.

I claim:

1. A transducer for measuring the displacement of an elastic support member under compression as a function of an applied compressive force comprising:

a support member constructed of a material which responds to forces to be measured with repeatable elastic characteristics and which responds to changes in temperature within a range of operating temperatures with retraceable characteristics and which has a low temperature coefficient of expansion;

said support member having a first set of first facing surfaces defining a first spacing gap where said first facing surfaces are displacable relative to one another as a function of compression of said support member;

first capacitor plate means on said first facing surfaces for deriving a first capacitance measurement as a function of displacement of said first facing surfaces;

said support member having a second set of second facing surfaces defining a second spacing gap located transversely relative to said first spacing gap in said support member; and second capacitor plate means on said second facing surfaces for deriving a second capacitance measurement as a function of displacement of said second facing surfaces where said first and second capacitance measurements are interrelated functions of the temperature of said support member and where said first and second capacitance measurements are interrelated functions of the displacement of said first facing surfaces and said second facing surfaces.

2. The transducer as defined in claim 1 wherein said member is constructed of quartz material.

3. The transducer as set forth in claim 1 wherein said second set of second facing surfaces are annular and extend over a vertical length "l" and where the outer surface of said support member over said vertical length "l" is cylindrical so that the length "l" is the active measurement length which changes in response to temperature and compression.

4. The transducer as set forth in claim 3 where the active measurement length "l" is equal to the radius of the outer annular second facing surface from a central diameter location.

5. A transducer for measuring the displacement of an elastic material under the compression as a function of applied compressive force comprising:

a cylindrically shaped integral support member constructed of a material which responds to forces to be measured with repeatable elastic characteristics and which responds to changes in temperatures within a range of operating temperatures with retraceable characteristics and which has a low temperature coefficient of expansion;

said support member having upper and lower annular ring portions and a cylindrically shaped central portion;

said central portion having cylindrically shaped upper and lower facing surfaces in parallel planes for defining a first spacing gap, said parallel planes being transverse to the central axis for said support member;

said central portion having an annular space defining inner and outer cylindrically shaped and facing wall surfaces for defining a second spacing gap with a vertical length "l"; and capacitor plate means on said cylindrical wall surfaces and on said upper and lower facing surfaces for providing at least two electrical capacitors respectively in transverse planes where displacement of said first and second spacing gaps is a function of compression force applied to said ring portions and where the spacing of said first and second spacing gaps is a function of temperature over the vertical length "l".

6. The transducer as defined in claim 5 wherein said member is constructed of quartz material.

7. The transducer as defined in claim 6 wherein a transverse plane to the central axis of said support member bisects the spacing gap between said upper and lower facing surfaces, and said member has a mirror image construction with respect to said transverse plane.

8. The transducer as defined in claim 7 wherein said support member has a uniform construction about the central axis of said member.

9. The transducer as defined in claim 5 wherein said capacitor plate means include thin metalized films.

10. The transducer as defined in claim 5 where the length "l" is equal to the radius for said outer wall surface.

11. A transducer for measuring a compressive force while compensating for temperature effects comprising:

a cylindrically shaped support member constructed with upper and lower components integrally joined together at a transverse plane to a central axis of said support member, said upper and lower components having central facing surfaces and defining a first spacing gap between said facing surfaces;

each of said components being constructed of a ring member part, a toroid member part and a flanged member part where said toroid member part is integrally joined with a flange portion of said flanged member part and said ring member part is integrally joined with said flange member part for defining an annular spacing gap between annular facing surfaces on said toroid part member and said ring part member where said annular spacing gap has an active measurement length "l"; and capacitor plate means on each of said facing surfaces for providing at least two electrical capacitors.

12. The transducer as defined in claim 11 wherein said support member is constructed of a material which responds to forces to be measured with repeatable elastic characteristics, and which responds to temperature within a range of operating temperatures with retraceable characteristics and which has a low temperature coefficient of expansion.

13. The transducer as defined in claim 12 wherein said member is constructed of quartz material.

14. The transducer as defined in claim 12 wherein said support member is constructed of quartz material;

said capacitor plate means include thin metalized films;

said toroid member part and said flange member part have access openings for electrical conductor means; and electrical conductor means connected to said thin metalized films for connection of said capacitor plate means to electrical circuitry.

15. The transducer as defined in claim 14 and further including a layer of metalized film on the end surface of a flange part member.

16. The transducer as defined in claim 14 wherein said electrical conductor means include metalized films.

17. The transducer as defined in claim 14 wherein the flanged member part has an annular depending ring portion which has an internally located lower curved surface joining the inner cylindrical wall of the depending ring portion and which has an annular semi-circular groove located in the surface of the flange portion in a position in vertical alignment with said lower curved surface.

18. The transducer as defined in claim 12 wherein said toroid member part has an annular outer groove.

19. The transducer as defined in claim 12 wherein the length "l" is equal to the radius of the outermost annular surface.

* * * * *